US008671887B2

(12) United States Patent
Baker et al.

(10) Patent No.: US 8,671,887 B2
(45) Date of Patent: Mar. 18, 2014

(54) ORTHOPEDIC PET BED (75) Inventors: Robert Baker, Dandridge, TN (US);
Jeffrey L. Jones, Dandridge, TN (US);
Mark V. Jackson, Sevierville, TN (US)

(73) Assignee: Pedigree Systems, Inc., Dandridge, TN (US)

( * ) Notice: Subject to any disclaimer, the term of this patent is extended or adjusted under 35 U.S.C. 154(b) by 18 days.

(21) Appl. No.: 13/471,562

(22) Filed: May 15, 2012

(65) Prior Publication Data

US 2012/0291711 A1 Nov. 22, 2012

Related U.S. Application Data (60) Provisional application No. 61/486,626, filed on May 16, 2011.

(51) Int. Cl.
*A01K 1/015* (2006.01)

(52) U.S. Cl.
USPC .......................................... 119/28.5; 5/655.3

(58) Field of Classification Search
USPC .............. 119/28.5; 5/420, 630, 655.3
See application file for complete search history.

(56) References Cited

U.S. PATENT DOCUMENTS

| | | | | | |
|---|---|---|---|---|---|
| 2,032,248 | A | * | 2/1936 | Bins | 119/482 |
| 2,834,970 | A | * | 5/1958 | Moritz | 5/420 |
| 4,445,240 | A | * | 5/1984 | Voorhees | 5/655.5 |
| 4,459,714 | A | * | 7/1984 | Lin | 5/655.3 |
| 4,468,824 | A | * | 9/1984 | O'Hanlan | 5/630 |
| D282,427 | S | * | 2/1986 | O'Sullivan | D6/601 |
| 4,576,375 | A | * | 3/1986 | Roberts | 482/27 |
| 4,777,679 | A | * | 10/1988 | DeLooper | 5/655.3 |
| 4,924,541 | A | * | 5/1990 | Inagaki | 5/652.1 |
| 4,942,634 | A | * | 7/1990 | Saloff et al. | 5/682 |
| 5,044,030 | A | * | 9/1991 | Balaton | 5/710 |
| 5,191,665 | A | * | 3/1993 | Breedlove | 5/656 |
| 5,195,199 | A | * | 3/1993 | Sereboff | 5/654 |
| 5,243,722 | A | * | 9/1993 | Gusakov | 5/655.3 |
| 5,388,295 | A | * | 2/1995 | Sarkozi | 5/630 |
| 5,632,051 | A | * | 5/1997 | Stanley et al. | 5/636 |
| 5,653,195 | A | * | 8/1997 | Young | 119/526 |
| 5,701,846 | A | * | 12/1997 | Parker, IV | 119/526 |
| 5,708,998 | A | * | 1/1998 | Torbik | 5/636 |
| 5,724,917 | A | * | 3/1998 | Dodson et al. | 119/526 |
| 6,015,471 | A | * | 1/2000 | Rimington et al. | 156/274.4 |
| 6,152,077 | A | * | 11/2000 | Bristow | 119/28.5 |
| 6,173,675 | B1 | * | 1/2001 | Licciardo | 119/28.5 |
| 6,546,580 | B2 | * | 4/2003 | Shimada | 5/710 |
| 6,553,938 | B2 | * | 4/2003 | Ikegami et al. | 119/161 |
| 6,966,275 | B2 | * | 11/2005 | Whitehill | 119/28.5 |
| 6,973,690 | B2 | * | 12/2005 | Muci et al. | 5/644 |
| 7,127,754 | B2 | * | 10/2006 | Le Gette et al. | 5/417 |
| 7,231,888 | B1 | * | 6/2007 | Kelly et al. | 119/28.5 |
| D560,947 | S | * | 2/2008 | Kreucher | D6/601 |
| 7,353,773 | B2 | * | 4/2008 | Lamstein et al. | 119/28.5 |
| 7,448,522 | B2 | * | 11/2008 | Collier et al. | 224/264 |
| 7,614,362 | B2 | * | 11/2009 | Dunn et al. | 119/28.5 |
| 7,921,807 | B2 | * | 4/2011 | Arvanites | 119/28.5 |
| 8,464,657 | B1 | * | 6/2013 | King | 119/28.5 |
| 2003/0066489 | A1 | * | 4/2003 | Whitehill | 119/28.5 |

(Continued)

*Primary Examiner* — Yvonne Abbott (74) *Attorney, Agent, or Firm* — Pitts & Lake, P.C.

(57) ABSTRACT

An orthopedic pet bed including an upper sheet and a lower sheet coupled together so as to define an interior volume subdivided into a plurality of cells, of which adjacent cells are in fluid communication with one another. The cells may be substantially shaped as hexagons, triangles, parallelograms, or any combination thereof.

24 Claims, 10 Drawing Sheets

(56) References Cited

U.S. PATENT DOCUMENTS

2006/0272581 A1* 12/2006 Dunn et al. ................. 119/28.5
2012/0118239 A1* 5/2012 Jacquart ...................... 119/28.5
2012/0266822 A1* 10/2012 Stevens et al. ............... 119/28.5

* cited by examiner

ORTHOPEDIC PET BED

CROSS-REFERENCE TO RELATED APPLICATIONS

This application claims priority from U.S. Provisional Application No. 61/486,626, filed on May 16, 2011.

FIELD OF INVENTION

The present general inventive concept relates generally to a structure upon which an animal may recline or be supported, and, more particularly, to a bed which aids in the orthopedic well being of domestic animals.

BACKGROUND

Hip dysplasia is a medical condition directly affecting the hip joints of dogs. A dog's hip joints are ball-and-socket joints that rotate freely to allow dogs to walk. If one of a dog's two hip joints grows abnormally, or if the two joints do not match in shape and form, then the dog may develop a limp. Hip dysplasia can also lead to other symptoms and complications, and the condition can aggravate other health issues, such as arthritis.

Hip dysplasia normally occurs during a young dog's growing stages. Hip dysplasia can affect both the left and the right hips, causing intense discomfort for the dog. The condition usually develops due to the laxity of the ligaments, connective tissues, and muscles around the joints. Hip dysplasia is commonly regarded as a genetic disease. However, many dogs are born with normal hip joints but acquire the condition while growing into adulthood. Certain factors cause the soft tissues around the hip joints to grow peculiarly. When the bones develop too far apart from each other, the bones become unstable.

Generally, dogs of larger breeds are more prone to hip dysplasia than smaller dogs. Purebred dogs are also more prone to the condition than cross-breeds. The types of dogs most likely to exhibit hip dysplasia include the Saint Bernard, Great Dane, Labrador Retriever, German Shepherd, Golden Retriever, and Rottweiler.

Loose hip joints are the main precursor to hip dysplasia. This condition of the joints usually leads to arthritis, a disease characterized by pain and swelling. Arthritis is one of the end effects of hip dysplasia, and hip dysplasia can also aggravate arthritis occurring from other causes.

BRIEF SUMMARY

The present general inventive concept, in some of its embodiments, includes a bed or similar support structure in which two sheets define an interior volume, said interior volume being further subdivided into a plurality of cells, with adjacent cells being in fluid communication with one another. The subdivision of the interior volume into cells generally is achieved by coupling the upper sheet and the lower sheet at a plurality of predetermined points.

Additional aspects and advantages of the present general inventive concept will be set forth in part in the description which follows, and, in part, will be obvious from the description, or may be learned by practice of the present general inventive concept.

The foregoing and/or other aspects and advantages of the present general inventive concept may be achieved by an orthopedic pet bed including an upper sheet and a lower sheet coupled together so as to define an interior volume subdivided into a plurality of cells, of which adjacent cells are in fluid communication with one another.

Perimeters of the upper and lower sheet may be continuously coupled to form an outer boundary of the interior volume.

The perimeters of the upper and lower sheet may be coupled by a perimeter banding.

The interior volume may be divided into discrete sections by a forming ring provided around a center of the orthopedic pet bed between the upper and lower sheets.

The cells may be substantially shaped as hexagons, triangles, parallelograms, or any combination thereof.

The cells may be formed by coupling the upper and lower sheet at predetermined interior points.

The coupling of the upper and lower sheet may be by spot welding.

The cells may be structured such that no cell will be centrally depressed to a point at which the upper and lower sheets are in contact.

The cells may be filled with air, gel, fluid, or any combination thereof.

The cells may be filled with a non-toxic fluid solution with a freezing point below the freezing point of water.

The cells may be filled with ethylene glycol and/or propylene glycol.

The upper sheet and/or lower sheet may be fabricated from a polymeric material.

The upper sheet and/or lower sheet may be fabricated from polyurethane.

The upper sheet and/or lower sheet may be fabricated from polyethylene.

The upper sheet and/or lower sheet may be fabricated from a mixture of polymeric materials.

The foregoing and/or other aspects and advantages of the present general inventive concept may also be achieved by an orthopedic pet bed including a bed member including an upper sheet and a lower sheet perimetrically coupled to define an interior volume, wherein the interior volume is subdivided into a plurality of cells by a plurality of points coupling the upper sheet and the lower sheet, adjacent cells being in fluid communication with one another such that no one cell is completely depressed under application of weight to the bed.

The cells may be configured to form substantially hexagonal, parallelogrammatic, and/or triangular cells.

The cells may be filled with air, gel, fluid, or any combination thereof.

The orthopedic pet bed may further include at least one foam pad formed on the upper sheet and/or the lower sheet.

The orthopedic pet bed may further include a removable cover.

The orthopedic pet bed may further include a moisture resistant inner cover.

The orthopedic pet bed may further include a liquid absorbing pad provided to the upper sheet.

The liquid absorbing pad may be affixed to the upper sheet by one or more adhesive strips.

The orthopedic pet bed may further include a liquid resistant membrane provided to at least a substantial portion of a bottom surface of the liquid absorbing pad.

The liquid absorbing pad may be at least partially formed of a Super Absorbent Polymer (SAP).

Other features and aspects may be apparent from the following detailed description, the drawings, and the claims.

BRIEF DESCRIPTION OF THE FIGURES

The following example embodiments are representative of example techniques and structures designed to carry out the objects of the present general inventive concept, but the present general inventive concept is not limited to these example embodiments. In the accompanying drawings and illustrations, the sizes and relative sizes, shapes, and qualities of lines, entities, and regions may be exaggerated for clarity. A wide variety of additional embodiments will be more readily understood and appreciated through the following detailed description of the example embodiments, with reference to the accompanying drawings in which.

DETAILED DESCRIPTION

Reference will now be made to various example embodiments of the present general inventive concept, examples of which are illustrated in the accompanying drawings and illustrations. The example embodiments are described herein in order to explain the present general inventive concept by referring to the figures.

The following detailed description is provided to assist the reader in gaining a comprehensive understanding of the structures and fabrication techniques described herein. Accordingly, various changes, modification, and equivalents of the structures and fabrication techniques described herein will be suggested to those of ordinary skill in the art. The progression of fabrication operations described are merely examples, however, and the sequence type of operations is not limited to that set forth herein and may be changed as is known in the art, with the exception of operations necessarily occurring in a certain order. Also, description of well-known functions and constructions may be omitted for increased clarity and conciseness.

Various embodiments of the present general inventive concept, as described herein, provide a bed or similar support structure in which two sheets define an interior volume, said interior volume being further subdivided into a plurality of cells, with adjacent cells being in fluid communication with one another. The subdivision of the interior volume into cells may be achieved by coupling the two sheets together at predetermined points through a number of different techniques, such as spot welds connecting the upper sheet and the lower sheet, using an applied adhesive agent, or the like, or any combination thereof. In the embodiments described herein, the coupling of the upper and lower sheets is generally described as involving the spot welding technique, though it is understood that other coupling methods may be substituted or use in combination.

Any of a number of predetermined geometric shapes may be provided for the cells, according to the chosen fabrication process and/or configuration. In most of the embodiments described herein, a hexagonal shape is described. However, it is understood that any other geometric shapes may be provided, such as triangles, various parallelograms, and so on. Also, different combinations of these geometric patterns may be present in the same bed. Further, these geometric shapes are not limited to the exact shapes described. For instance, a pattern referred to as square may be a substantially square four-sided pattern, and so on.

In various embodiments, the present general inventive concept comprises an orthopedic and/or therapeutic pet bed. In some embodiments, the present general inventive concept comprises a pet bed to treat, prevent, or ameliorate hip dysplasia in dogs. Also, although dogs are generally discussed in the embodiments described herein, it is understood that the various aspects of the present general inventive concept may be applicable to any type of domestic animal or pet.

In various example embodiments of the present general inventive concept, a pet bed comprises two sheets or panels (hereinafter "sheets"), generally an upper sheet and a lower sheet, coupled to each other at the perimeter of each sheet, such as by any general technique of bonding. Thus bonded together, the two sheets define an interior volume, which is further subdivided into a plurality of cells, with adjacent cells being in fluid communication with one another. As previously described, the subdivision of the interior volume into cells may be achieved by any of a number of coupling techniques, but is generally described herein as being achieved by spot welds connecting the upper sheet and the lower sheet. In various example embodiments, the spot welds connecting the upper sheet and the lower sheet are positioned or configured to form hexagonal cells that are in fluid communication with each other. However, as previously described, other shapes of the cells may be provided. Various example embodiments of other cell shapes will be discussed later in this description.

Figure 1:
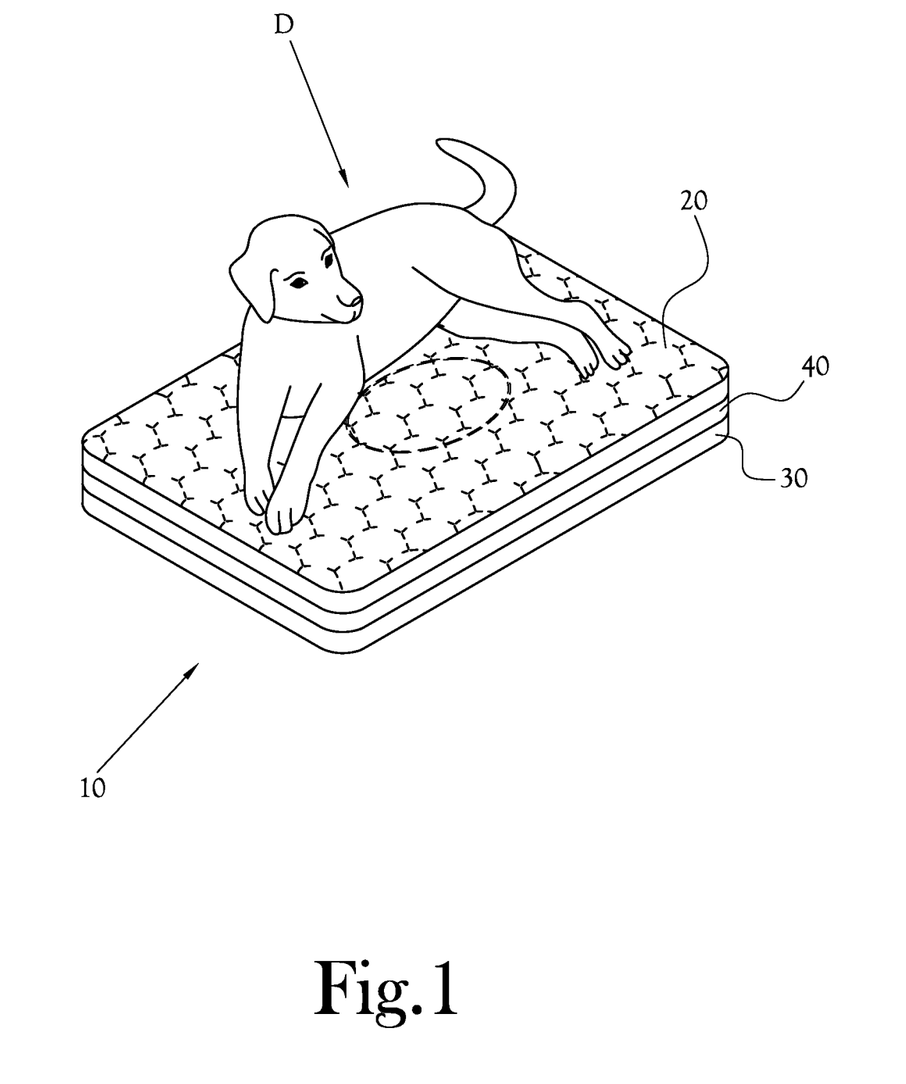
FIG. 1 is a perspective view illustrating one example embodiment of the present general inventive concept, showing a dog using an orthopedic pet bed.

FIG. 1 illustrates one example embodiment of an orthopedic pet bed according to the present general inventive concept. FIG. 1 illustrates a dog D resting on an upper sheet 20 of an orthopedic pet bed 10. The illustrated pet bed 10 comprises an upper sheet 20 and a lower sheet 30. The illustrated embodiment also includes a perimeter banding 40, to which both the upper sheet 20 and the lower sheet 30 are bonded, or otherwise coupled, at the perimeter of each sheet. In other embodiments, the upper sheet and lower sheet are perimetrically coupled directly to each other.

Figure 2:
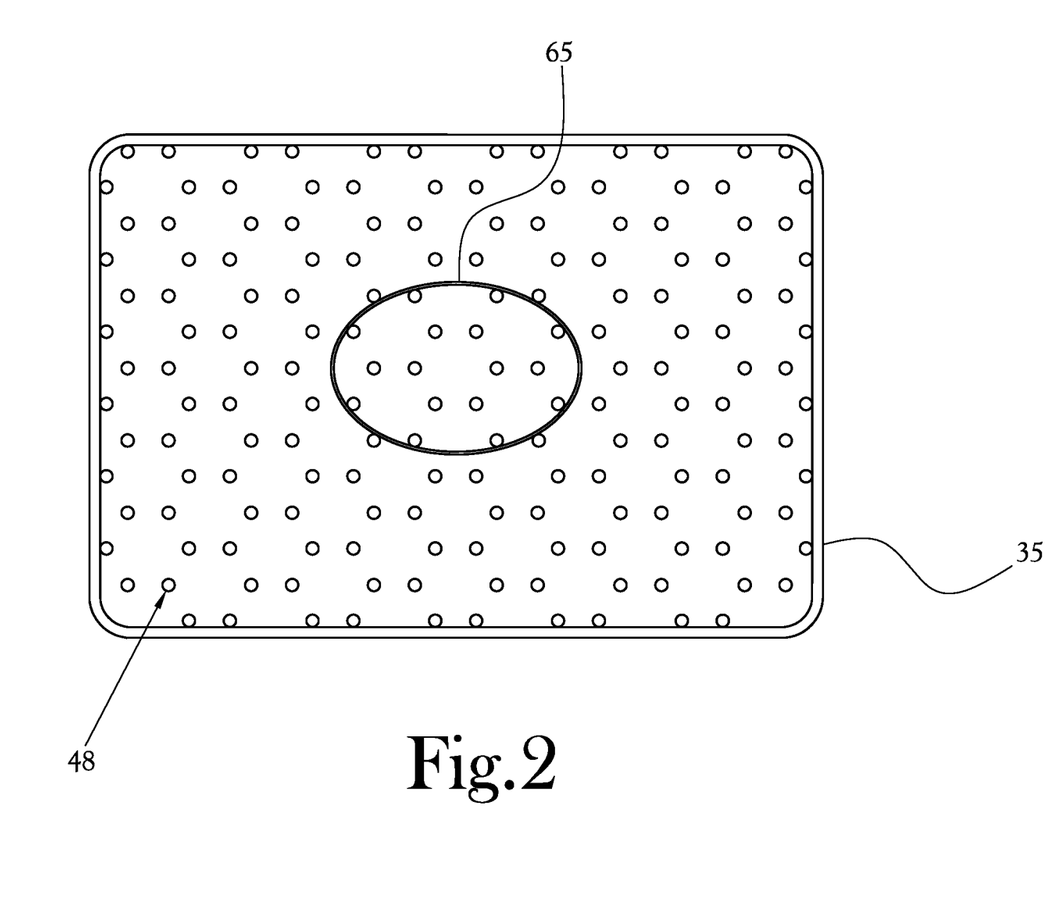
FIG. 2 illustrates a top view of a die which may be used in the fabrication of the example embodiment illustrated in FIG. 1, illustrating the positioning and configuration of pegs that are used in the formation of spot welds connecting the upper sheet and the lower sheet.

FIG. 2 illustrates a top view of an example die or mold which may be used in the fabrication of the example embodiment illustrated in FIG. 1. As illustrated in FIG. 2, the die 35 includes a plurality of pegs 48. During the fabrication process, the pegs 48 provide the foci where spot welds are formed to couple the upper sheet 20 and the lower sheet 30. In the illustrated embodiment of the die 35, the pegs 48 are positioned and configured so that the spot welds, when formed, are positioned so that they form hexagonal cells that are in fluid communication with each other, such that the hexagonal cells comprise a hexagonal tessellation. In alternate embodiments, the pegs are positioned so that the spot welds are configured so that they form substantially triangular cells, substantially square cells, etc., that are in fluid communication with each other.

Figure 3:
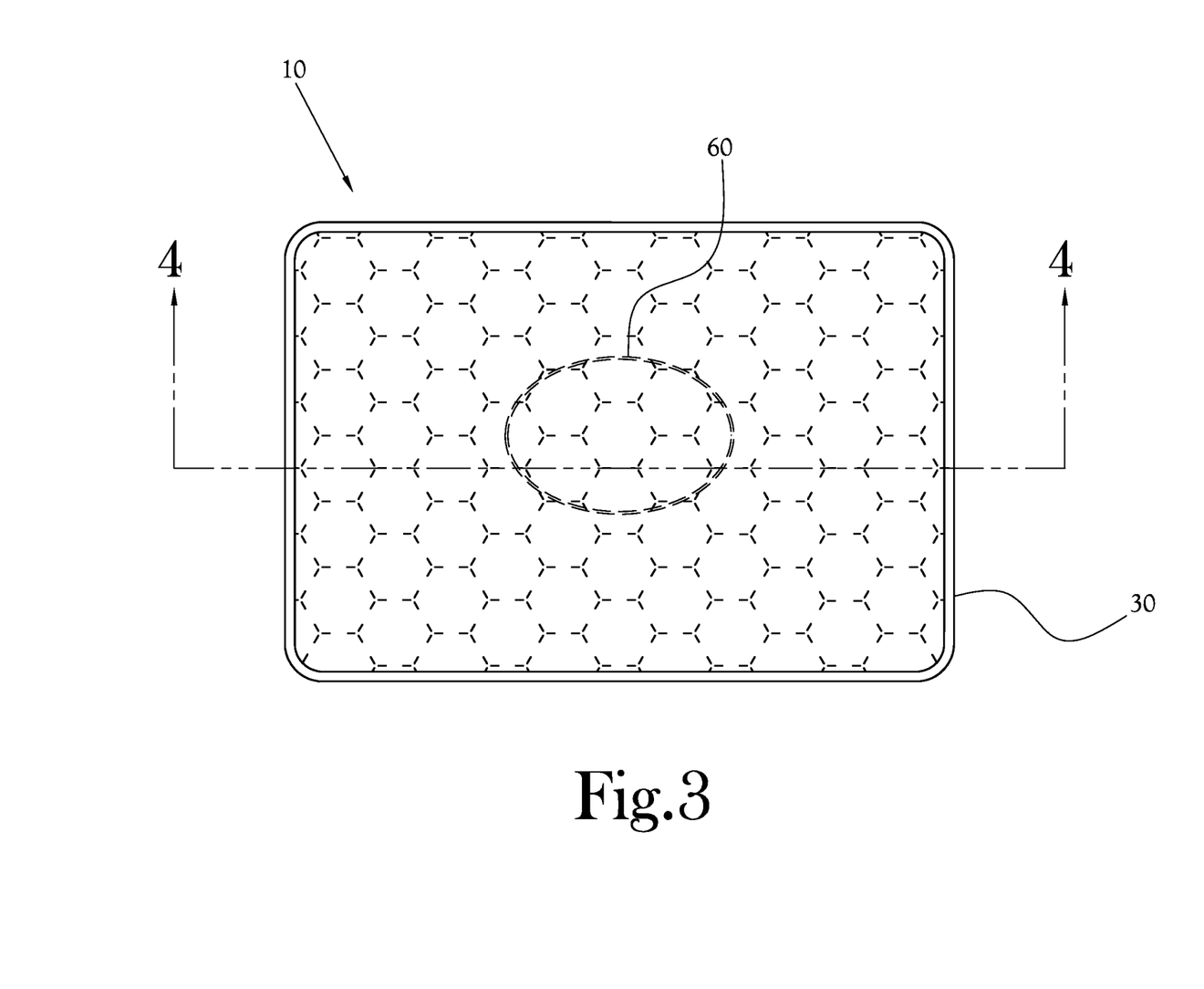
FIG. 3 illustrates a top view of the example embodiment shown in FIG. 1, including the section line along which the section view of FIG. 4 is taken.
Figure 4:
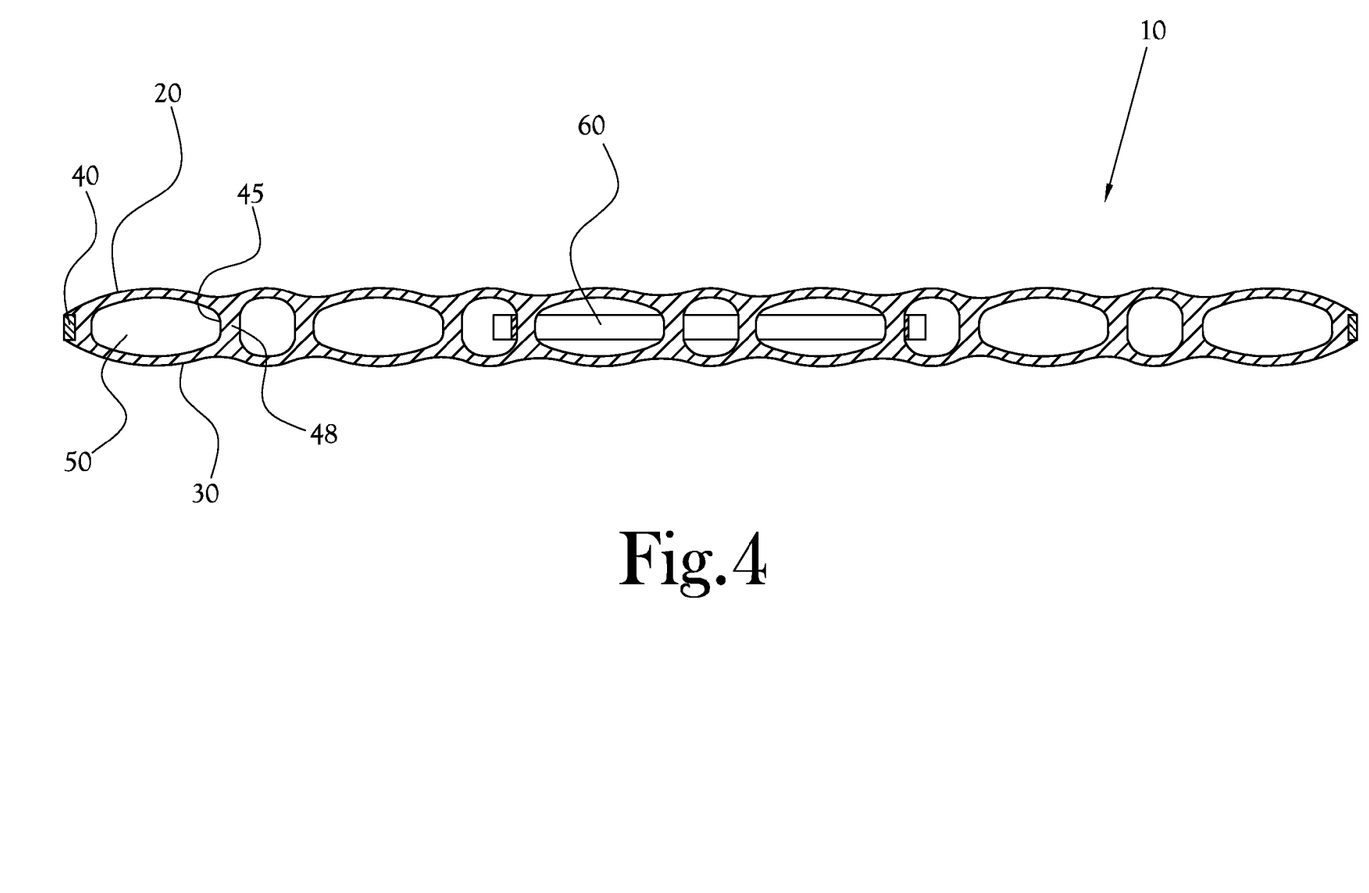
FIG. 4 illustrates a section view of the example embodiment illustrated in FIGS. 1 and 3, taken along the section line shown in FIG. 3.
Figure 5:
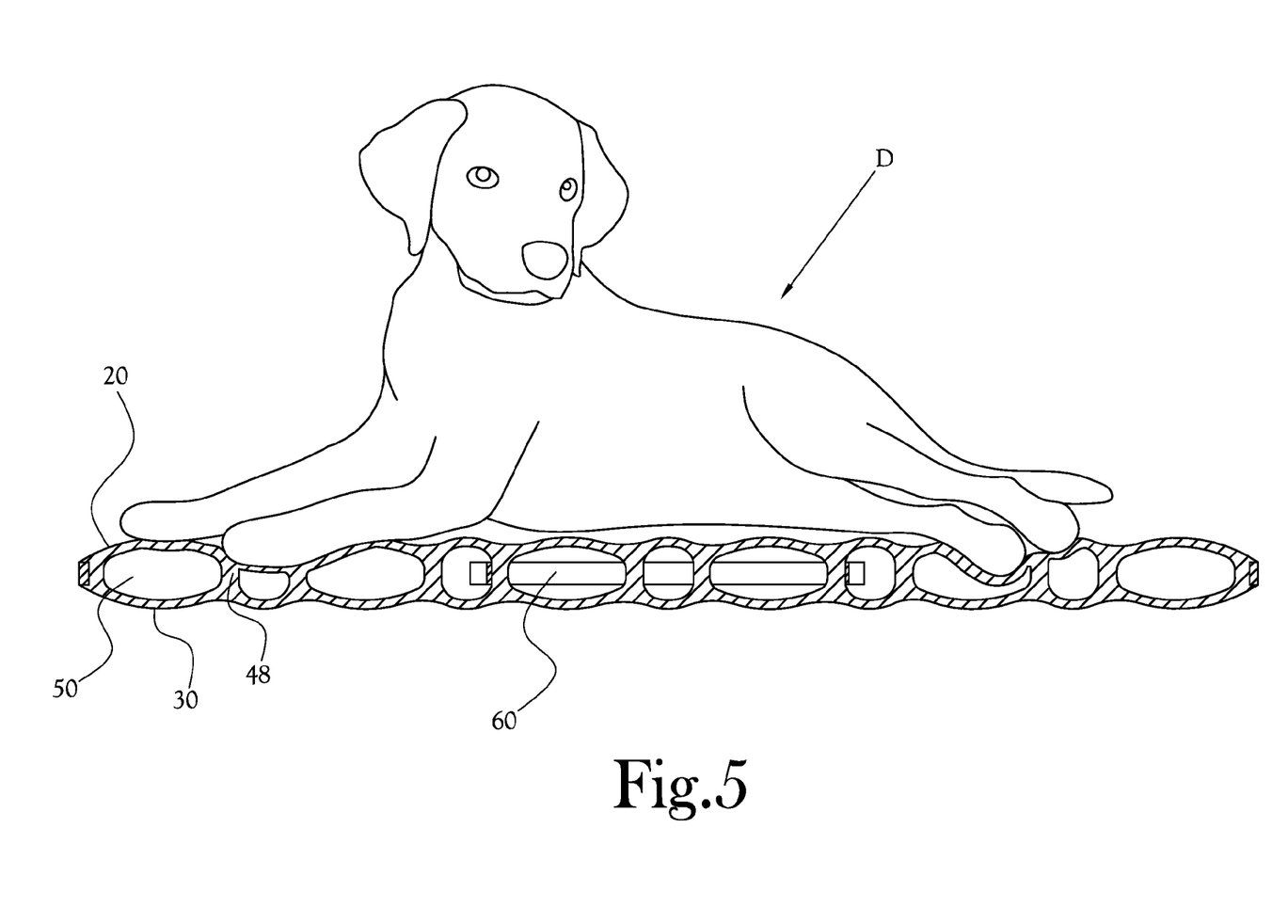
FIG. 5 illustrates a view of the section view illustrated in FIG. 4, with a dog using the pet bed according to the illustrated example embodiment.

FIG. 3 illustrates a top view of the example embodiment pet bed 10 illustrated in FIG. 1, and formed on the die 35 illustrated in FIG. 2. FIG. 3 also illustrates the section line along which the section view of FIGS. 4 and 5 is taken. As illustrated in the sectional view in FIG. 4, within the interior volume defined by the upper sheet 20, the lower sheet 30, and the perimeter banding 40, a number of spot welds 45 connect the upper sheet 20 to the lower sheet 30. Cells 50 are defined by the regions between spot welds 45. As previously discussed, in various embodiments the spot welds 45 may be positioned so that they form hexagonal cells 50 that are in fluid communication with each other, such that the hexagonal cells 50 comprise a hexagonal tessellation H, as illustrated in FIG. 3. In alternate embodiments, the spot welds may be configured so that they form other shapes, such as substantially triangular or parallelogrammatic cells that are in fluid communication with each other.

When fully assembled, the cells 50 of the pet bed 10 may be filled with air, gel, fluid, or any combination thereof (Hereinafter, the term "fluid" shall be used to refer to air, gels, and other fluids, such as liquid fillers or water-based solutions.) In various embodiments, the cells may be filled with a silicon solution or with other various non-toxic substances such as ethylene glycol, propylene glycol, etc., which will not freeze in most cold weather conditions if the pet bed 10 is used out of doors. (The fluid chosen has a freezing point lower than the freezing point of water.) As illustrated in FIG. 5, when a dog D does rest on the pet bed 10, the upper sheet 20 is depressed in certain locations by the weight of the dog D, compressing the cells 50 directly below the dog D and driving some fluid into adjacent cells. However, the structure of the dog bed—and in particular the combination of the configuration of the spot welds 45, the size of the cells 50, the thickness of the bed 10 and the overall quantity and pressure of fluid within the volume defined between the upper sheet 20 and the lower sheet 30—is such that substantially no cell 50 is completely depressed, and the upper sheet 20 does not contact the lower sheet 30 within any of the cells depressed by the weight of the dog D. Thus, at all points beneath the dog D, fluid is exerting gentle pressure on the dog D. The pet bed 10 thereby both yields to the dog's weight and provides support for the dog's hips and joints, helping to prevent or ameliorate hip dysplasia, and thus reducing stress on the animal. The resulting reduction of stress provides a greater degree of rest and, ultimately, a better quality of life.

Bed stiffness generally is a function of the physical size and shape of the individual cells as well as the thickness of the sheets. In various example embodiments of the present general inventive concept, the upper sheet and/or the lower sheet may be fabricated from polyurethane. In various embodiments, the upper sheet and/or the lower sheet may be fabricated from polyethylene. In various embodiments, the upper sheet and/or the lower sheet may be fabricated from a polyvinyl material (such as polyvinyl chloride) or a similar polymer or blends thereof. In various embodiments, the upper sheet and/or the lower sheet may be fabricated from a mixture of polymers. In various embodiments, the upper sheet and/or the lower sheet may be fabricated from a blend of polyurethane and a polyvinyl material. In various embodiments, the upper sheet and/or the lower sheet may be fabricated from other materials. In various embodiments, the downward (or exterior) face of the lower sheet may be textured or patterned so that it will inhibit skidding or accidental horizontal movement of the pet bed.

In various example embodiments of the present general inventive concept, such as the example embodiment 10 illustrated in FIG. 1 and FIGS. 3 through 5, the pet bed may include a solid ring 60 substantially near the center of the pet bed 10. A forming ring 65 in the die 35, as shown in FIG. 2, may be used to facilitate the formation of the solid ring 60 in the finished pet bed 10. The solid ring 60 further subdivides the interior volume of the pet bed 10 into two regions (the intra-ring and extra-ring) and prevents the flow of fluid between the two regions. Generally, dogs resting on the pet bed 10 will position themselves so that the dog's body and legs partially surround the ring 60, as shown in FIG. 1. The presence of the ring 60 prevents the accumulation of fluid in the center of the pet bed 10 and helps to ensure that the distribution of fluid between the cells 50 in the pet bed 10 is properly balanced for the comfort and orthopedic health of the dog.

In an example embodiment of the present general inventive concept, the upper sheet and the lower sheet may both be fabricated from a polyurethane-based material, and each sheet may be approximately 15 mil thick. In this example embodiment, the upper sheet and the lower sheet may be combined into a pet bed that, when fully inflated with air, gel, or fluid, is approximately ¾ inch thick at the widest points. The spot welds, which may be positioned and configured to form a tessellation pattern of hexagonal cells, may be formed on pegs that are substantially circular or cylindrical and that may be approximately ⅛ to ½ inch in diameter and ¼ inch in height.

The other dimensions of the pet bed may vary to some extent depending on a number of factors, including the size of the dog. In some particular embodiments, pet beds of 20 inches by 30 inches, or 30 inches by 40 inches, or 40 inches by 50 inches, are contemplated. Those of skill in the art will recognize that the present general inventive concept encompasses numerous other potential sizes and dimensions.

Figure 6:
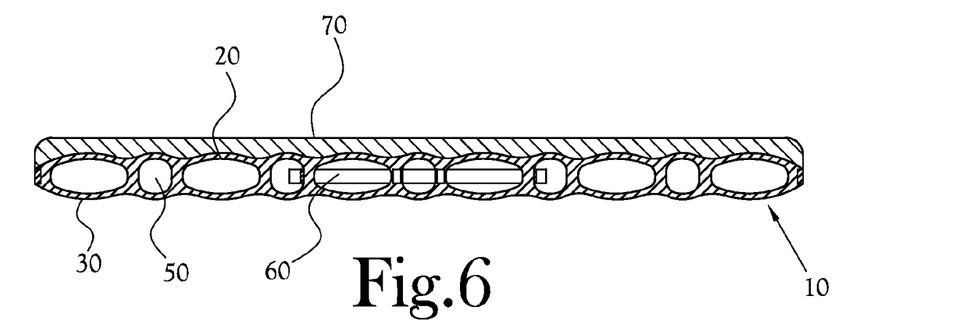
FIG. 6 illustrates a section view of an example embodiment of the present general inventive concept including a foam pad supplementing the orthopedic pet bed, the foam pad being on top of the pet bed.
Figure 7:
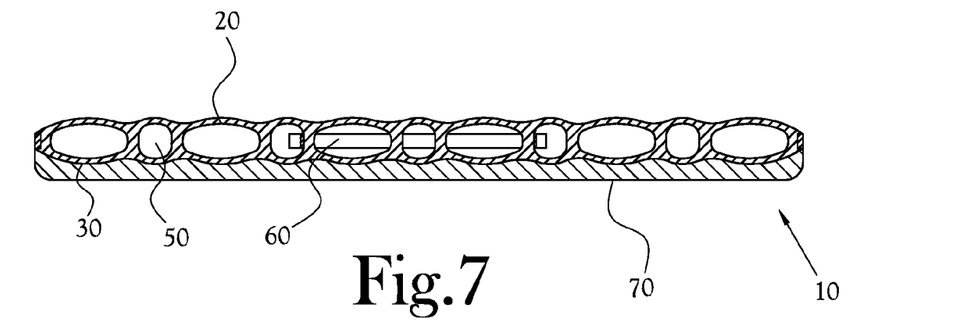
FIG. 7 illustrates a section view of another example embodiment of the present general inventive concept including a foam pad supplementing the orthopedic pet bed, the foam pad being beneath the pet bed.
Figure 8:
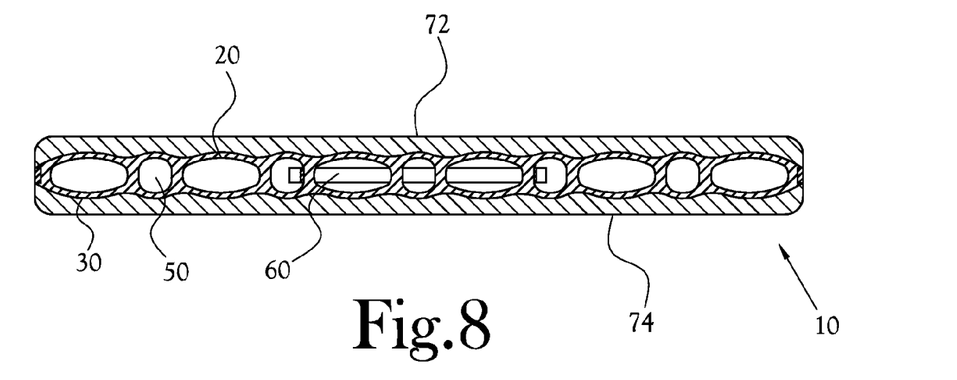
FIG. 8 illustrates a section view of an example embodiment of the present general inventive concept including two foam pads supplementing the orthopedic pet bed, one foam pad being positioned on top of the pet bed, and the other foam pad being positioned beneath the pet bed.

FIGS. 6, 7, and 8 are section views that illustrate additional example embodiments of the present general inventive concept, in which a bed member 10 with fluid-filled intercommunicating cells 50 is combined with a foam pad 70. The layer of foam pad 70 provides additional comfort for the dog. In one example embodiment, illustrated in FIG. 6, the foam pad 70 is positioned on top of the bed member 10. In another example embodiment, illustrated in FIG. 7, the foam pad 70 is positioned beneath the pet bed member 10. In another example embodiment, illustrated in FIG. 8, two foam pads 72 and 74 are employed with the bed member 10, one foam pad 72 being positioned on top of the bed member 10 and the other foam pad 74 being positioned beneath the bed member 10. In various embodiments, the bed member and one or more foam pads may be surrounded by an outer cover, such as a pillow or a fabric bag, that contains the pet bed and the one or more foam pads. The outer cover may aid in keeping the components together when the combined structure is in use, and can be separately removed and washed apart from the pet bed and the one or more foam pads. A moisture resistant inner cover may be provided inside the removable and washable outer cover. Examples of the outer cover and moisture resistant inner cover will be described later in regard to FIGS. 14A-B.

Figure 9A:
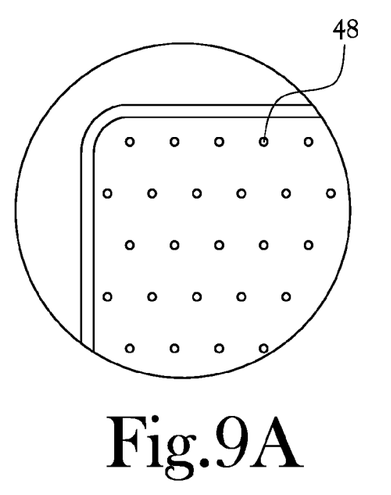
FIGS. 9A-B illustrate partial top views of a fabrication die and resulting cell structure of the orthopedic pet bed according to another example embodiment of the present general inventive concept.
Figure 9B:
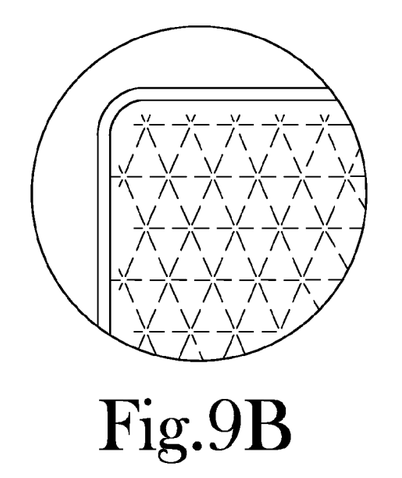

FIGS. 9A-B illustrate partial top views of a fabrication die and resulting cell structure of an orthopedic pet bed according to another example embodiment of the present general inventive concept. As illustrated in FIG. 9A, the pegs 48 are positioned such that the upper and lower sheets are coupled at points that result in the substantially triangular cell patterns illustrated in FIG. 9B.

Figure 10A:
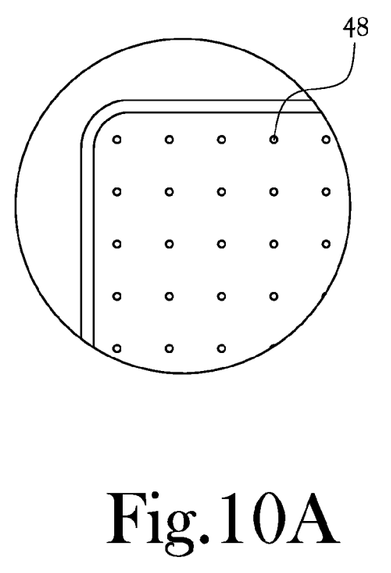
FIGS. 10A-B illustrate partial top views of a fabrication die and resulting cell structure of the orthopedic pet bed according to yet another example embodiment of the present general inventive concept.
Figure 10B:
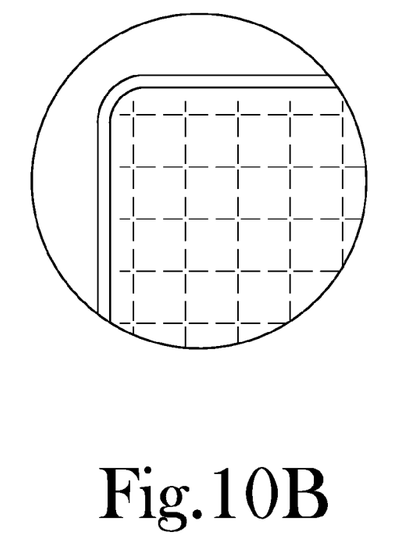

FIGS. 10A-B illustrate partial top views of a fabrication die and resulting cell structure of an orthopedic pet bed according to another example embodiment of the present general inventive concept. As illustrated in FIG. 10A, the pegs 48 are positioned such that the upper and lower sheets are coupled at points that result in the substantially square cell patterns illustrated in FIG. 10B.

Figure 11A:
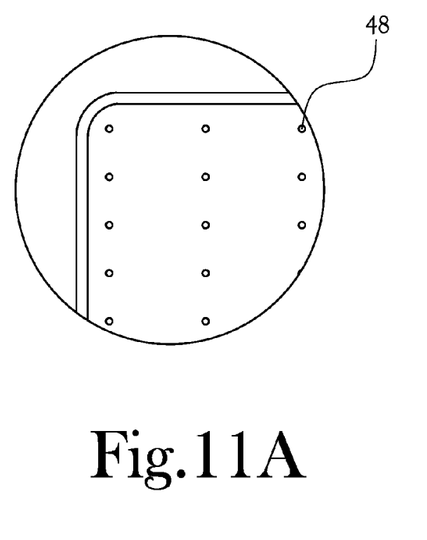
FIGS. 11A-B illustrate partial top views of a fabrication die and resulting cell structure of the orthopedic pet bed according to still another example embodiment of the present general inventive concept.
Figure 11B:
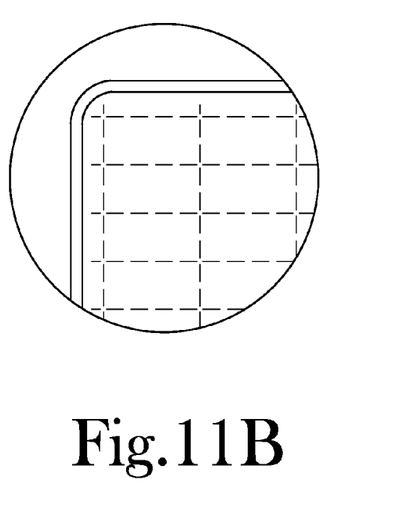

FIGS. 11A-B illustrate partial top views of a fabrication die and resulting cell structure of an orthopedic pet bed according to another example embodiment of the present general inventive concept. As illustrated in FIG. 11A, the pegs 48 are positioned such that the upper and lower sheets are coupled at points that result in the substantially rectangular cell patterns illustrated in FIG. 11B.

Figure 12A:
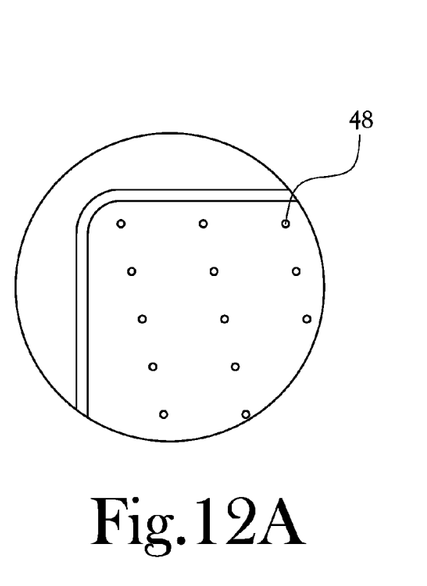
FIGS. 12A-B illustrate partial top views of a fabrication die and resulting cell structure of the orthopedic pet bed according to yet another example embodiment of the present general inventive concept.
Figure 12B:
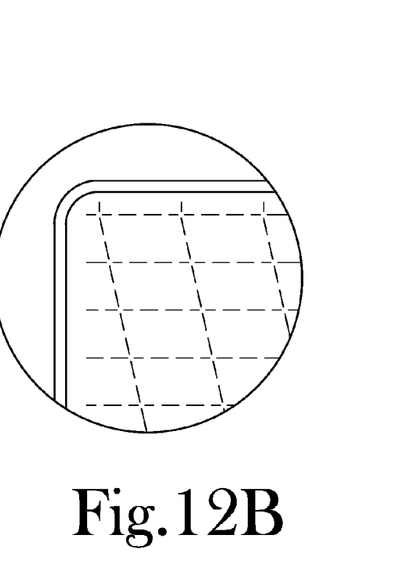

FIGS. 12A-B illustrate partial top views of a fabrication die and resulting cell structure of an orthopedic pet bed according to another example embodiment of the present general inventive concept. As illustrated in FIG. 12A, the pegs 48 are positioned such that the upper and lower sheets are coupled at points that result in patterns approximating substantial parallelograms as illustrated in FIG. 9B.

These and other various geometric patterns, or any combination thereof, may be used for different functional characteristics of the orthopedic pet bed, and/or for aesthetic preferences.

Figure 13A:
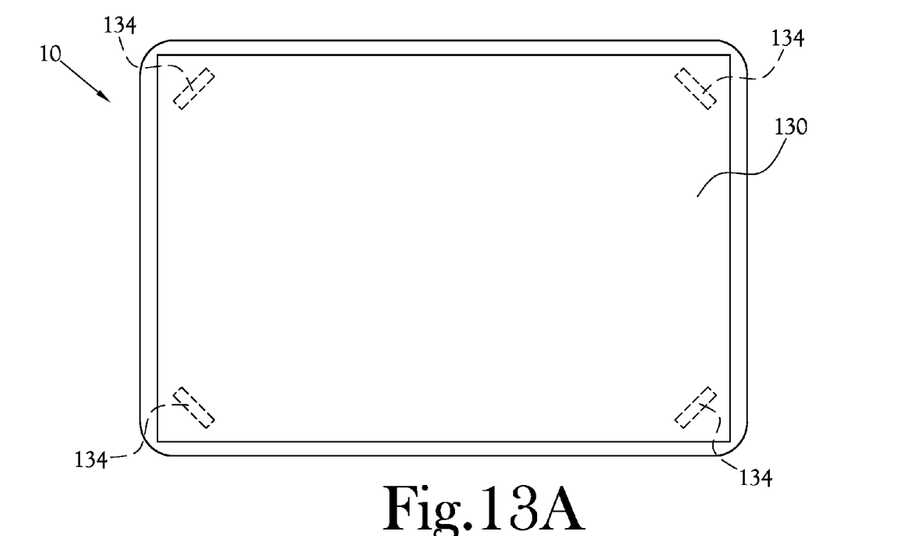
FIGS. 13A-13C illustrate an example embodiment of the present general inventive concept including a liquid absorbing pad provided to the orthopedic pet bed.
Figure 13B:
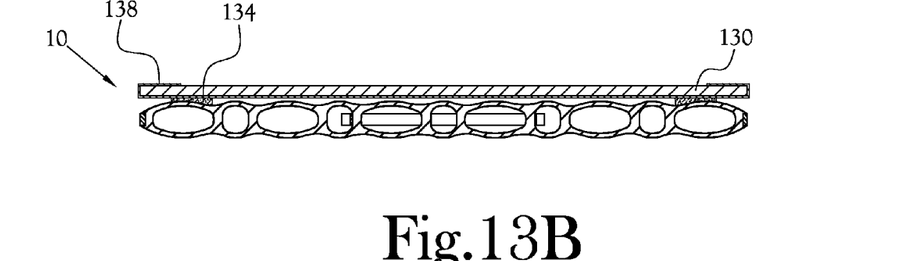
Figure 13C:
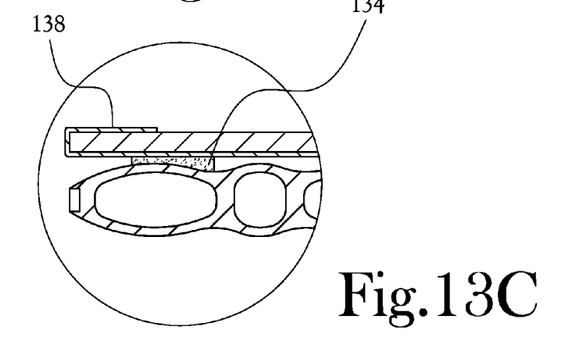

FIGS. 13A-C illustrate an example embodiment of the present general inventive concept in which a bed member 10 with fluid-filled intercommunicating cells 50 is combined with a removable liquid absorbing pad 130. FIG. 13A illustrates a top view of the bed member 10 provided with the liquid absorbing pad 130, FIG. 13 B illustrates a sectional view of the embodiment illustrated in FIG. 13A, and FIG. 13C illustrates a more detailed view of a partial section of FIG. 13B in which an optional liner is provided to the liquid absorbing pad 130.

As illustrated in FIGS. 13A-13C, the liquid absorbing pad 130 is provided to absorb liquid such as urine, as incontinence can be a common issue in more mature pets. The liquid absorbing pad 130 may be disposable, and may be affixed to the bed member 10 in any number of ways. In the example embodiment of FIGS. 13A-C the liquid absorbing pad 130 is affixed to the bed member by adhesive strips 134 provided proximate to each corner of the bed member 10. The adhesive strips 134 may be provided with the liquid absorbing pad 130, or provided separately. However, the liquid absorbing pad 130 may be fixed to the bed member 10 in any number of ways, such as by Velcro®, straps provided to one or more corners of the liquid absorbing pad 130, fitted corner pockets, and the like.

As illustrated in FIGS. 13B-C, a polyethylene backer sheet may be formed with the liquid absorbing pad 130 to form a waterproof or otherwise liquid resistant membrane 138 which prevents liquids absorbed by the liquid absorbing pad 130 from contacting the bed member 10. In this example embodiment, the membrane 138 wraps around the top edge of the liquid absorbing pad 130 to further prevent against such leakage and to hold the liquid within the liquid absorbing pad 130. The liquid absorbing pad 130 may be formed of a Super Absorbent Polymer (SAP) impregnated pulp.

Figure 14A:
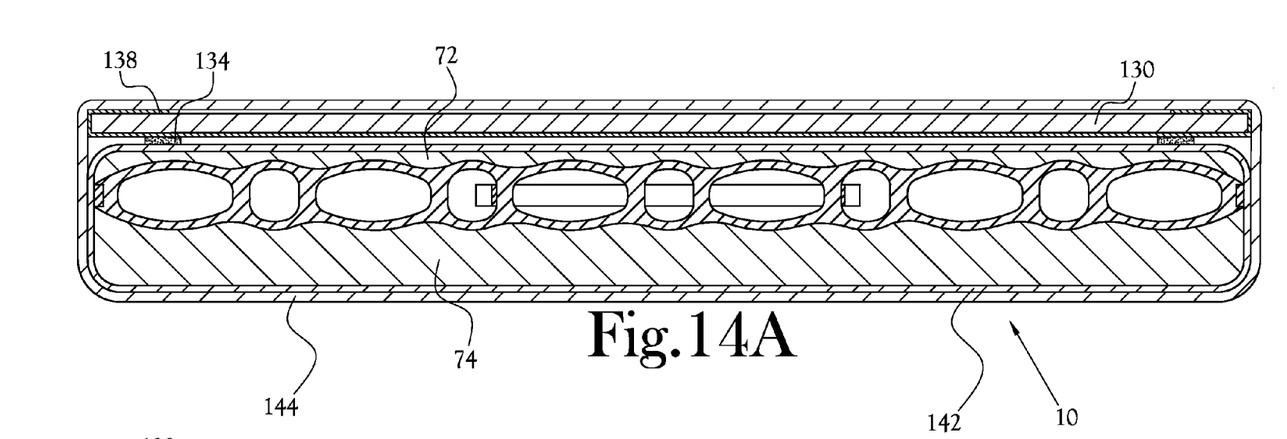
FIGS. 14A-B illustrate section views of additional example embodiments of the present general inventive concept that combine several features from previously described embodiments.
Figure 14B:
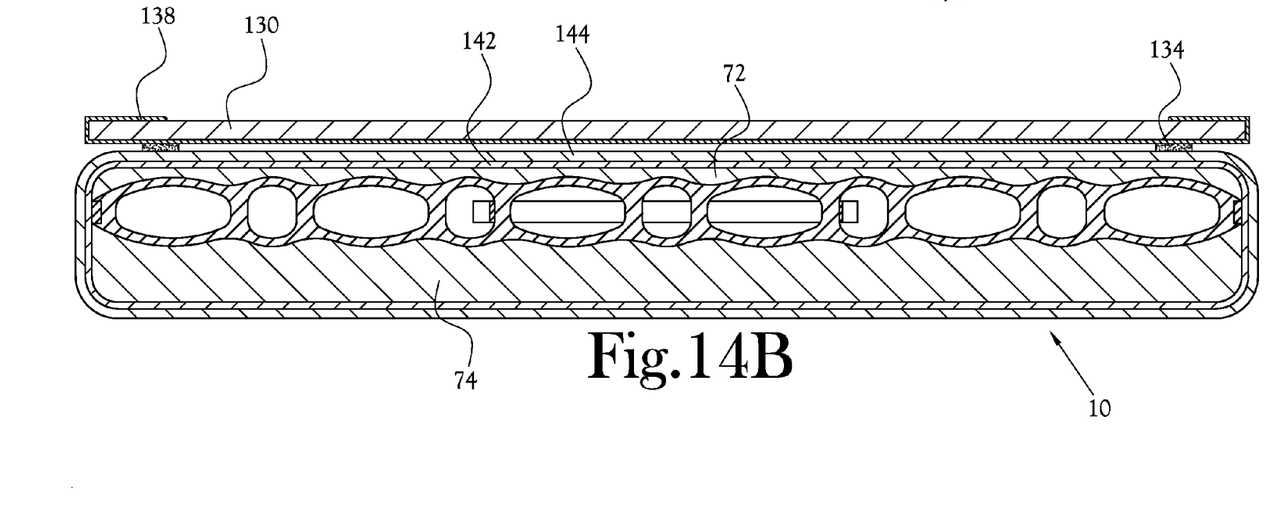

FIGS. 14A-B illustrate section views of additional example embodiments of the present general inventive concept that combine several features from previously described embodiments. In each of these figures the bed member 10 is provided with the foam pads 72,74 respectively above and below the bed member 10. In these example embodiments, the lower foam pad 74 is illustrated as being substantially thicker than the upper foam pad 72. However, the thicknesses of either pad, as well as the materials used to form the pads, may vary according to various example embodiments. The foam pads may be formed of a memory type foam. A moisture resistant inner cover 142 is provided to enclose the bed member 10 and foam pads 72,74. The inner cover 142 aids in keeping moisture and odors away from the foam pads 72,74 and bed member 10, and may be provided with a zipper, buttons, or the like to close the cover.

Similarly to the example embodiment illustrated in FIGS. 13A-C, the orthopedic pet beds of FIGS. 14A-B are provided with the removable liquid absorbing pad 130. In FIG. 14A, a removable outer cover 144, which may also be washable, is provided outside the moisture resistant inner cover 142, and the removable liquid absorbing pad 130 is provided between the moisture resistant inner cover 142 and the outer cover 144. In the example embodiment illustrated in FIG. 14B, the removable liquid absorbing pad 130 is provided on the outer surface of the outer cover 144. The outer cover 144 may be formed of a soft material such as a washable faux suede, and may also be provided with a non-skid material on the underside of the outer cover 144 to avoid unwanted movement of the orthopedic pet bed, in order to prevent injuries.

According to various embodiments of the present general inventive concept, a bed or similar support structure includes two sheets which define an interior volume, said interior volume being further subdivided into a plurality of cells, with adjacent cells being in fluid communication with one another. The subdivision of the interior volume into cells may be achieved by coupling the upper sheet and the lower sheet at a plurality of predetermined points.

It is noted that the simplified diagrams and drawings do not illustrate all the various connections and assemblies of the various components, however, those skilled in the art will understand how to implement such connections and assemblies, based on the illustrated components, figures, and descriptions provided herein. Numerous variations, modification, and additional embodiments are possible, and, accordingly, all such variations, modifications, and embodiments are to be regarded as being within the spirit and scope of the present general inventive concept.

While the present general inventive concept has been illustrated by description of several example embodiments, and while the illustrative embodiments have been described in detail, it is not the intention of the applicant to restrict or in any way limit the scope of the general inventive concept to such descriptions and illustrations. Instead, the descriptions, drawings, and claims herein are to be regarded as illustrative in nature, and not as restrictive, and additional embodiments will readily appear to those skilled in the art upon reading the above description and drawings. Additional modifications will readily appear to those skilled in the art. Accordingly, departures may be made from such details without departing from the spirit or scope of applicant's general inventive concept.

The invention claimed is:

1. An orthopedic pet bed comprising:
   an upper sheet and a lower sheet coupled together so as to define an interior volume subdivided into a plurality of cells, of which adjacent cells are in fluid communication with one another; and
   a ring disposed between the upper and lower sheets, the ring dividing the interior volume into two regions and preventing fluid communication between the two regions.

2. The orthopedic pet bed of claim 1, wherein perimeters of the upper and lower sheet are continuously coupled to form an outer boundary of the interior volume.

3. The orthopedic pet bed of claim 2, wherein the perimeters of the upper and lower sheet are coupled by a perimeter banding.

4. The orthopedic pet bed of claim 1, wherein the cells are substantially shaped as hexagons, triangles, parallelograms, or any combination thereof.

5. The orthopedic pet bed of claim 1, wherein the cells are formed by coupling the upper and lower sheet at predetermined interior points.

6. The orthopedic pet bed of claim 5, wherein the coupling of the upper and lower sheets is by spot welding.

7. The orthopedic pet bed of claim 1, wherein the cells are structured such that no cell will be centrally depressed to a point at which the upper and lower sheets are in contact.

8. The orthopedic pet bed of claim 1, wherein the cells are filled with air, gel, fluid, or any combination thereof.

9. The orthopedic pet bed of claim 8, wherein the cells are filled with a non-toxic fluid solution with a freezing point below the freezing point of water.

10. The orthopedic pet bed of claim 8, wherein the cells are filled with ethylene glycol and/or propylene glycol.

11. The orthopedic pet bed of claim 1, wherein said upper sheet and/or said lower sheet are fabricated from a polymeric material.

12. The orthopedic pet bed of claim 11, wherein said upper sheet and/or said lower sheet are fabricated from polyurethane.

13. The orthopedic pet bed of claim 11, wherein said upper sheet and/or said lower sheet are fabricated from polyethylene.

14. The orthopedic pet bed of claim 1, wherein said upper sheet and/or said lower sheet are fabricated from a mixture of polymeric materials.

15. An orthopedic pet bed, comprising:
   a bed member including an upper sheet and a lower sheet perimetrically coupled to define an interior volume;
   the interior volume being subdivided into a plurality of cells by a plurality of points coupling the upper sheet and the lower sheet, adjacent cells being in fluid communication with one another such that no one cell is completely depressed under application of weight to the bed; and
   a ring disposed between the upper and lower sheets, the ring dividing the interior volume into two regions and preventing fluid communication between the two regions.

16. The orthopedic pet bed of claim 15 wherein the cells are configured to form substantially hexagonal, parallelogrammatic, and/or triangular cells.

17. The orthopedic pet bed of claim 15 wherein the cells are filled with air, gel, fluid, or any combination thereof.

18. The orthopedic pet bed of claim 15, further comprising at least one foam pad formed on the upper sheet and/or the lower sheet.

19. The orthopedic pet bed of claim 15, further comprising a removable cover.

20. The orthopedic pet bed of claim 19, further comprising a moisture resistant inner cover.

21. The orthopedic pet bed of claim 15, further comprising a liquid absorbing pad provided to the upper sheet.

22. The orthopedic pet bed of claim 21, wherein the liquid absorbing pad is affixed to the upper sheet by one or more adhesive strips.

23. The orthopedic pet bed of claim 21, further comprising a liquid resistant membrane provided to at least a substantial portion of a bottom surface of the liquid absorbing pad.

24. The orthopedic pet bed of claim 21, wherein the liquid absorbing pad is at least partially formed of a Super Absorbent Polymer (SAP).

* * * * *